United States Patent
Nachbaur et al.

(10) Patent No.: US 8,310,434 B2
(45) Date of Patent: Nov. 13, 2012

(54) APPARATUS AND METHOD FOR DRIVING DISPLAYS

(75) Inventors: Oliver Nachbaur, Munich (DE);
Byung-Seok Kim, Munich (DE);
Erich-Johann Bayer, Thonhausen (DE);
Ivan Shumkov, Freising (DE)

(73) Assignee: Texas Instruments Deutschland GmbH, Freising (DE)

( * ) Notice: Subject to any disclaimer, the term of this patent is extended or adjusted under 35 U.S.C. 154(b) by 547 days.

(21) Appl. No.: 12/619,141

(22) Filed: Nov. 16, 2009

(65) Prior Publication Data

US 2010/0220087 A1    Sep. 2, 2010

Related U.S. Application Data

(60) Provisional application No. 61/141,887, filed on Dec. 31, 2008.

(30) Foreign Application Priority Data

Nov. 18, 2008    (DE) .......................... 10 2008 057 892

(51) Int. Cl.
    *G09G 3/36*    (2006.01)

(52) U.S. Cl. ........................................ 345/101; 345/211
(58) Field of Classification Search ........................ None
    See application file for complete search history.

(56) References Cited

U.S. PATENT DOCUMENTS

| | | | |
|---|---|---|---|
| 5,621,306 A | 4/1997 | Ise | |
| 6,897,081 B2 * | 5/2005 | Hsiung et al. | 438/48 |
| 7,676,340 B2 * | 3/2010 | Yasui et al. | 702/104 |
| 2003/0227756 A1 | 12/2003 | Abe | |
| 2008/0252378 A1 * | 10/2008 | Hughes | 330/284 |

FOREIGN PATENT DOCUMENTS

EP    1098292    5/2001

* cited by examiner

*Primary Examiner* — Muhammad N Edun
(74) *Attorney, Agent, or Firm* — John J. Patti; Wade J. Brady, III; Frederick J. Telecky, Jr.

(57) ABSTRACT

Generally, displays, like liquid crystal displays (LCDs), use a DC-free addressing voltage in order to prevent decomposition of the display. Here, an integrated circuit (IC) is provided that compensates for temperature dependencies. This IC typically uses a thermistor or temperature varying element to measure the temperature of the display and adjusts the common reference voltage in response to the measured temperature.

20 Claims, 4 Drawing Sheets

APPARATUS AND METHOD FOR DRIVING DISPLAYS

CROSS-REFERENCE TO RELATED APPLICATIONS

This patent application claims priority from German Patent Application No. 10 2008 057 892.4, filed 18 Nov. 2008, and from U.S. Provisional Patent Application No. 61/141,887, filed 31 Dec. 2008, the entireties of which are incorporated herein by reference.

FIELD OF THE INVENTION

The invention relates to an integrated circuit, which includes an adjustable voltage buffer for providing a common reference voltage for a display.

BACKGROUND

Displays as, for example, liquid crystal displays (LCD) require a DC-free addressing voltage in order to prevent decomposition of the display. The LCD basically operates based on the root mean square (RMS) voltage provided by an AC voltage drop across a pixel. FIG. 1 shows a simplified circuit diagram of a single pixel of an LCD. VDATA is the addressing voltage for driving the pixel. An adjustable voltage buffer provides a common reference voltage VCOMOUT for the back plane of the LCD, which eliminates the DC portion of the voltage VPIX across the pixel and ensures that only an AC current flows through the pixel.

FIG. 2 shows a graph of a curve representing the required temperature dependency of the common reference voltage VCOMOUT in response to a temperature change of the LCD. VCOMOUT may remain constant up to a threshold value TTH of the display temperature. If the threshold temperature TTH is exceeded, the common reference voltage VCOMOUT should be increased with a steep slope SS. After this first steep increase, the ascending slope of the common reference voltage VCOMOUT decreases slowly. For example, for a temperature below the threshold temperature TTH of 40° C., the common reference voltage VCOMOUT may remain at 5.350 V. If the threshold temperature TTH of 40° C. is reached, an initial voltage step of about 0.03 to 0.04 V may be performed. Between 40° C. and 150° C. the common reference voltage is to be increased almost linearly until about 90° C. and after that with a decreasing slope until 5.75 V.

In order to comply with the diagram shown in FIG. 2, the circuit according to the prior art shown in FIG. 3 is used. A target voltage at node INPOS for the common reference voltage VCOMOUT is derived by a voltage divider R1, R2 from the supply voltage AVDD. Node INPOS is the positive input of the amplifier AMP, which may be configured as a voltage follower. The output of the amplifier AMP provides the common reference voltage VCOMOUT. A controlled current source CCS1 is also coupled to the positive input of the amplifier. CCS1 serves to adjust the common reference voltage VCOMOUT in accordance with a digital input signal DIN. The digital input signal DIN is a control signal which represents a current temperature of the LCD to which the common reference voltage VCOMOUT is supplied. Memory MEM contains a look-up table of digital values necessary to set the controlled current source CCS1 so as to provide the required output voltage VCOMOUT in response to a display temperature. Any type of LCD may require a different look-up table. The digital to analog converter DAC is adapted to provide an analog output signal based on the digital input signal DIN and the data received from the memory MEM. The output signal of the DAC controls the controlled current source CCS1 as a function of the temperature behavior of the LCD. However, the circuit shown in FIG. 3 is rather complex and requires a large (in terms of chip area of an integrated circuit) memory MEM for storing data values representing the relationship between VCOMOUT and the temperature of the LCD.

SUMMARY

In an aspect of the invention an apparatus is provided, which comprises an adjustable voltage buffer for providing a common reference voltage for a display, and a control stage adapted to control the adjustable voltage buffer so as to vary the common reference voltage as a function of a temperature of the display. The display may be a liquid crystal display (LCD) or a display having similar properties. In an advantageous embodiment of the invention the temperature of the display is determined by use of a thermistor. The thermistor may be coupled to the display. A control stage is provided which may be adapted to sense a current or a voltage indicating a variation of the resistance of the thermistor. The control stage of the apparatus may further be adapted to perform a common reference voltage variation based on the sensed resistance variation of the thermistor for compensating varying properties of the display due to temperature changes. A control voltage or a control current in the apparatus may then be varied in response to the resistance variation of the thermistor. There are many different ways of implementing a suitable control function for the common reference voltage in response to the resistance variation of the thermistor. In an advantageous embodiment of the invention, the control stage comprises analog circuitry including at least a sensing stage for sensing a voltage or a current indicating a variation of the resistance of the thermistor and a variable current source operating in response to the sensed current or voltage indicating the resistance variation of the thermistor. As there is no need to store the function as digital data values in the memory, this aspect of the invention provides that the apparatus needs no or less memory than conventional common reference voltage buffers.

In an advantageous aspect of the invention, there may be a resistive network comprising the thermistor. The resistive network may comprise the thermistor coupled in parallel to a first resistor and the thermistor and the first resistor may be coupled in series to a second resistor. The control stage may then be adapted to perform the common reference voltage variation in response to a resistance variation of resistive network, which includes the thermistor, the first resistor and second resistor. The resistive network comprising the thermistor, the first and the second resistors provides important characteristics of the function of the required common reference voltage of the temperature of the display for compensating the temperature change of the display. A current or voltage provided by the resistive network including the first resistor, the thermistor and the second resistor may then be sensed and used for controlling the amplifier which may be configured as a voltage follower.

In an advantageous embodiment, the apparatus may be an integrated semiconductor device. The apparatus may then comprise a pin, which is adapted to be coupled to the resistive network. If only a single pin is used for coupling the resistive network to the apparatus, the number of interconnections of the apparatus remains small. This keeps production costs small and supports high reliability of the apparatus.

In another aspect of the invention, the control stage may be adapted to keep the common reference voltage constant if the temperature of the display remains below a threshold value. Furthermore, the control stage may be adapted to increase the common reference voltage with a sudden slope which is steeper than any previous and/or following change of the common reference voltage. The previous two aspects of the invention take account of two important characteristics (shown in FIG. 2) of the temperature dependency of the common reference voltage of a liquid crystal display. These two aspects are the constant value of the common reference voltage below the threshold temperature and the sudden steep slope, if the temperature reaches the threshold temperature. After the slope the resistive network may have predominant influence on the common reference voltage and after a linear increase the ascending slop may smoothly decrease. Instead of using complex digital look-up tables and large memories for storing the corresponding data, at least a first variable current source may be coupled to provide a control current to an input of the amplifier. The variable current source may then be controlled as a function of a current through the thermistor. The function may advantageously be implemented by current mirrors. The current mirrors may be configured to sense the currents supplied to the resistive network and other resistors and to mirror the sensed current to an input node of the amplifier. Furthermore, there may be an offset current source being coupled to provide an offset current to the input of the amplifier so as to increase the common reference voltage with a sudden steep slope which is steeper than a previous increase of the common reference voltage. Still further, a reference current source may be provided and coupled to provide a reference current to the input of the amplifier so as to keep the common reference voltage constant if the temperature of the display remains below a threshold value. Therefore, the reference current may be subtracted from the control current. Only, if the control current is greater or equal to the reference current, the difference current becomes positive and the difference current may be fed to input of the amplifier.

The amplifier may be an amplifier coupled as a non-inverting voltage follower. The input of the amplifier may then be the positive input of the amplifier. The positive input of the amplifier may also be coupled to a voltage divider. If a current is drawn from or fed to the input node, the current will basically flow through the voltage divider and change the voltage and the input node of the amplifier. The common reference voltage at the output of the amplifier changes accordingly and provides that the display is properly driven.

These advantageous aspects and embodiments of the invention provide a simple and reliable implementation of a temperature compensated voltage buffer for a display.

The display may be a liquid crystal display (LCD). The thermistor may have a negative temperature coefficient.

The control currents, reference currents and the offset currents may be generated by use of constant reference voltages provided, for example, by a bandgap voltage source. A first reference voltage and a second reference voltage may be applied to a third resistor a fourth resistor for providing the reference current and the offset current. Furthermore, a reference voltage may be applied to the resistive network including the thermistor. The current through the resistive network may then be sensed and used to control the amplifier. If the apparatus is implemented as an integrated semiconductor device, there may advantageously be pins for the resistive network and the third and fourth resistor. The temperature behavior of the common reference voltage may then be adapted for different displays or other conditions by using suitable first, second, third and fourth transistors. Therefore, there is no need for storing digital data values in a memory for temperature compensating the common reference voltage. According to these aspects of the invention, temperature compensation is performed through analog circuitry.

Furthermore, there may be a subtracting stage for subtracting the reference current from the control current. There may further be a summing stage. At the summing stage (i.e., for example, a simple summing node as summing stage) the offset current may then be added to the difference of the reference current and the control current. The resulting current may be the control current, which is fed to the input node of the amplifier (i.e., for example, the positive input of the amplifier configured as voltage follower).

A switch may be provided for selectively providing a connection between the summing node and the input of the amplifier. The control stage may then be adapted to control the switch so has to connect the summing node and the input node of the amplifier, only if the current of the first variable current source exceeds the current of the reference current source. Thereby, a simple analog circuitry is provided, which implements the basic functions for providing a common reference voltage for a display which compensates the temperature variations of the display.

In still another aspect of the invention, a method of operating a semiconductor apparatus is provided. The apparatus is adapted in accordance with one or more aspects of the invention as set out above. It may comprise an adjustable voltage buffer for providing a common reference voltage for a display. A resistance variation of a thermistor is generated as a function of a temperature of the display. The adjustable voltage buffer can be controlled in response to the resistance variation of the thermistor which may be determined through a voltage drop across the thermistor or a current through the thermistor. The current or voltage is sensed. There may be at least one variable current source which may be controlled in response to the sensed current through or sensed voltage across the thermistor. A current from the current source may then be fed to an input of an amplifier for varying the common reference voltage at the output of the amplifier.

In another aspect of the invention, a method of designing an IC 1 is provided. The method comprises the steps of providing an adjustable voltage buffer for providing a common reference voltage for a display and a control stage adapted to control the adjustable voltage buffer so as to vary the common reference voltage as a function of a temperature of the display. The temperature of the display is determined through a resistance variation of a thermistor being coupled to the display. The control stage may include at least a current source which is controlled in response to a sensed current through the thermistor or a voltage drop across the thermistor. Finally, the integrated semiconductor device is manufactured. Furthermore, a pin may be provided at the integrated semiconductor device, which is adapted to be coupled to the thermistor and/or a resistive network including the thermistor.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE DRAWINGS

Figure 4:
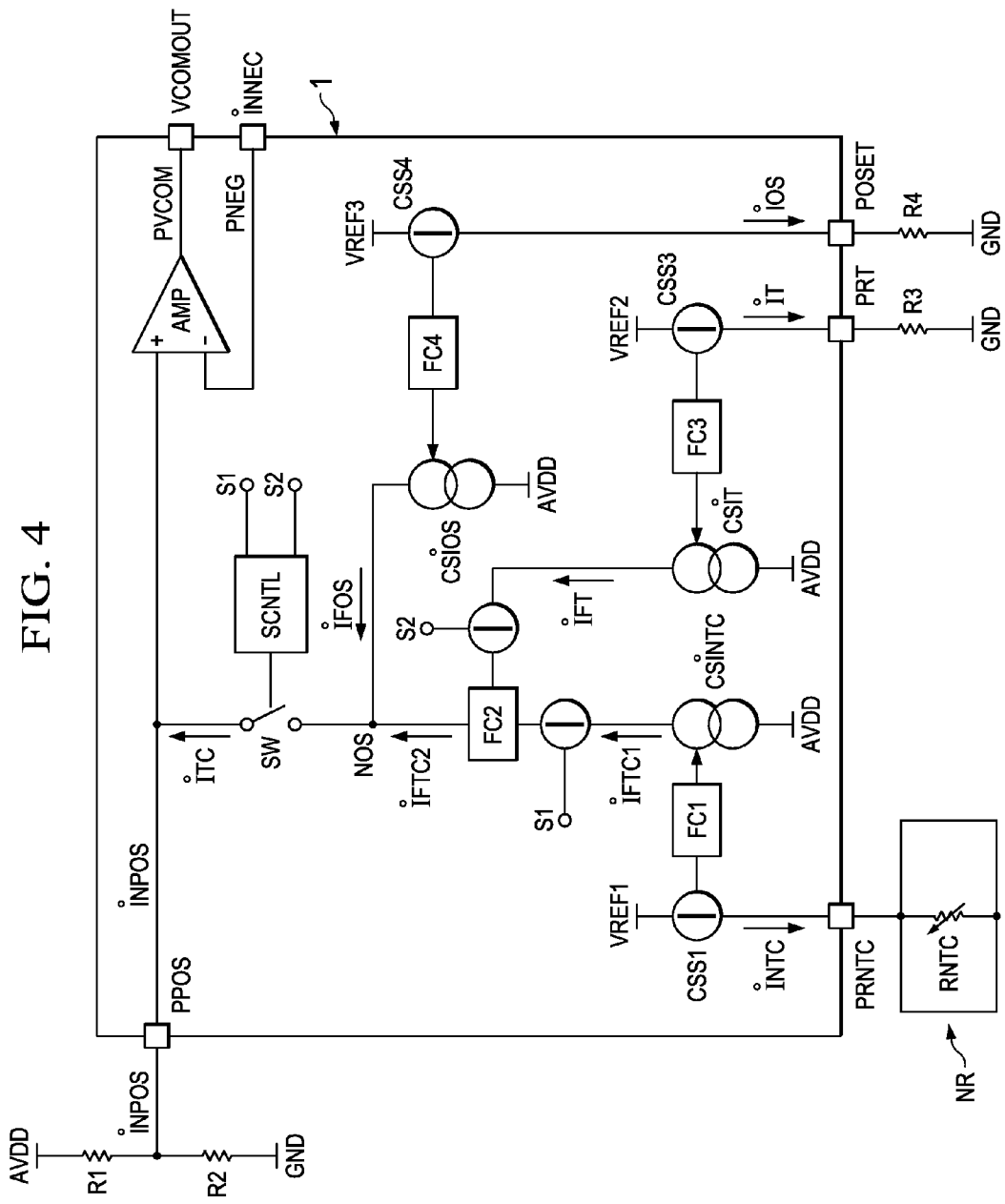
FIG. 4 is a simplified circuit diagram of an embodiment of the invention.

FIG. 4 shows a simplified circuit diagram of an embodiment of the invention. The solid rectangular line 1 delimits a possible boundary of an integrated circuit (IC) implemented in accordance with aspects of the present invention. The output of the amplifier AMP provides the common reference voltage VCOMOUT. The common reference voltage VCOMOUT is present at an output pin PVCOM of the integrated circuit. Pin PNEG is coupled to receive a signal INNEG. PNEG can be connected to the negative input of the amplifier AMP, so as to configure the amplifier AMP as a voltage follower or non-inverting amplifier by external circuitry. The positive input INPOS of the amplifier AMP is coupled to a pin PPOS. In an embodiment, a resistive voltage divider consisting of resistors R1 and R2 may be used to provide a predetermined voltage level derived from supply voltage AVDD to pin PPOS.

A controlled current source CSINTC is coupled to the positive input INPOS of the amplifier. Generally, the controlled current source CSINTC provides a current to the positive input node INPOS, the magnitude of which is controlled in response to a control signal which is derived by functional circuitry FC1 from a current INTC. The current INTC is sensed by a current sensor CSS1. Current sensor CSS1, functional circuitry FC1, and controlled current source CSINTC may be implemented by a current mirror. In this embodiment, the current INTC is generated by applying a reference voltage VREF1 to a resistive network NR. The resistive network NR may advantageously be coupled to a single pin PRNTC of the IC 1. Although several pins may be provided for coupling the resistive network NR, it is advantageous to use only a single pin in order to reduce complexity of the interconnections necessary to use the IC 1. The network includes at least a thermistor RNTC. The thermistor RNTC is coupled to change its resistance as a function of the temperature of the display which receives the common reference voltage VCOMOUT. Therefore, the current INTC represents or indicates the resistance variation of the thermistor.

The voltage level at the input node INPOS of the amplifier AMP varies dependent on the magnitude of current ITC, which is supplied to the input node INPOS. Generally, current ITC is a function of current INTC. Therefore, it is possible to adjust the common reference voltage VCOMOUT in response to a temperature of the display, to which the thermistor RNTC is coupled.

The current source CSINTC provides a current IFTC1 to functional circuitry FC2. Functional circuitry FC2 is coupled to controlled current source CSIT in order to receive a current IFT. In an embodiment of the invention, functional circuitry FC2 may subtract (or add dependent on the signs or directions of the currents) current IFT from current IFTC1, so as to provide the current IFTC2. The current IFT is generated similar to current IFTC by use of a second reference voltage VREF2 coupled to a resistor R3 and a functional circuitry FC3 for sensing current IT and controlling controlled current source CSIT. Current sensor CSS3, functional circuitry FC3, and current source CSIT may be implemented as a current mirror. Advantageously, a single pin PRT is provided to which resistor R3 can be coupled.

There is further a third reference voltage VREF3 applied to pin POSET, to which a resistor R4 is coupled for generating a current IOS. This current is sensed by current sensor CSS4. Functional circuitry FC4 is coupled to CSS4 and controls current source CSIOS in response to the sensed current IOS. CSIOS feeds a current IFOS to node NOS, where currents IFTC2 and IFOS are added. Current sensor CSS4, functional circuitry FC4, and current source CSIOS may be implemented as a current mirror.

A controller SCNTL may be coupled through sensing connections S1 and S2 to sense currents IFTC1 and IFT and to open and close switch SW if the current IFTC1 is equal to or greater than the current IFT. Controller SCNTL may comprise a Schmitt-trigger. The interaction of currents IFTC1, IFT and IFOS in combination with switch S1 provides a current ITC to input node INPOS of the amplifier AMP, which provides that the common reference voltage VCOMOUT is adjusted in accordance with the diagram shown in FIG. 2.

Figure 1:
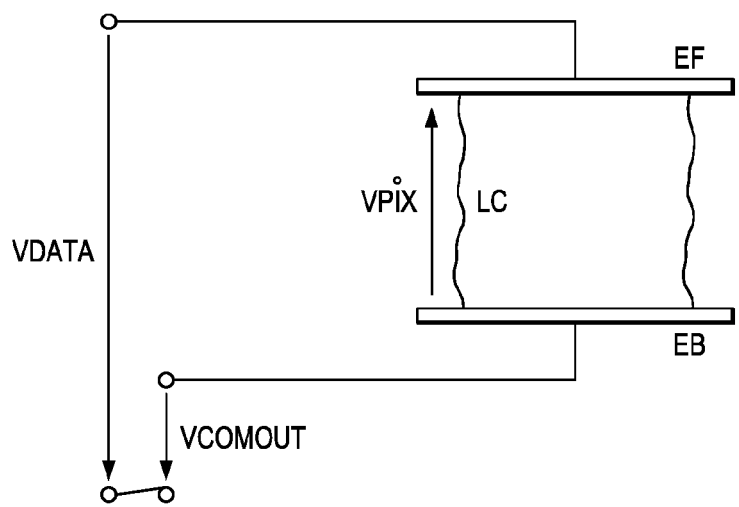
FIG. 1 is a simplified diagram of pixel of a liquid crystal display.
Figure 2:
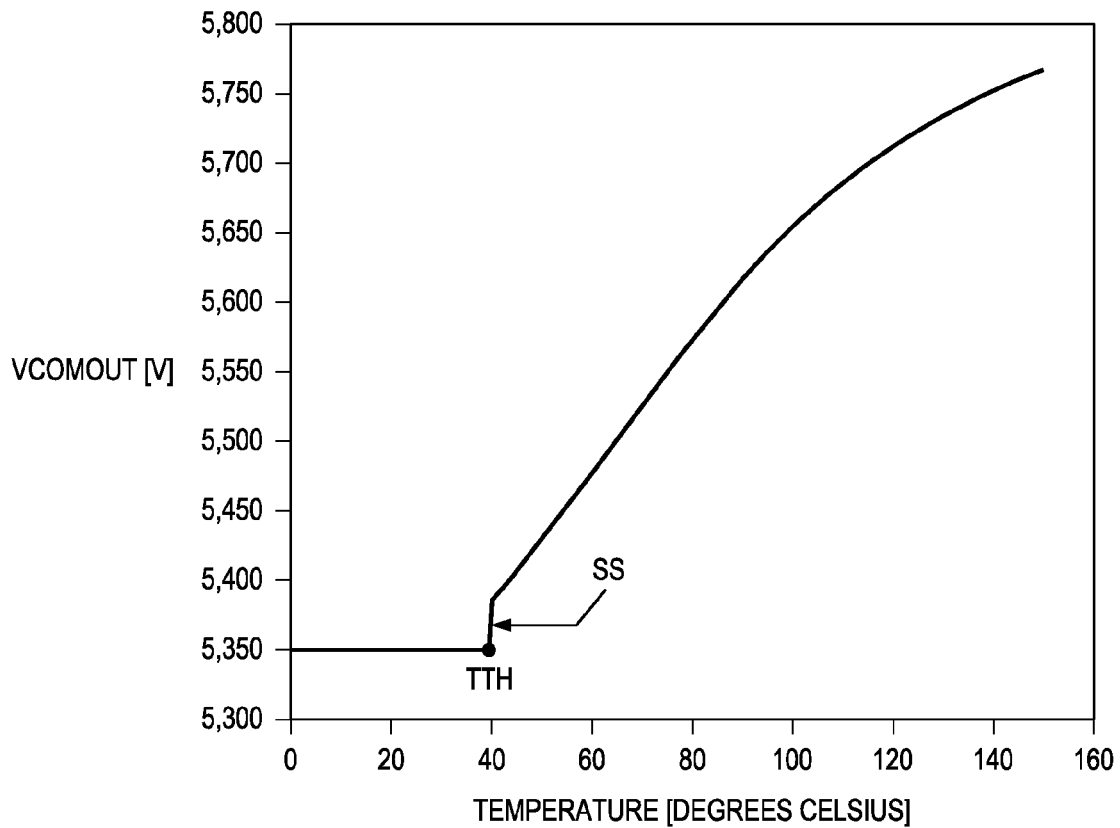
FIG. 2 is a graph representing a typical curve of the common reference voltage as a function of the temperature of the display.
Figure 3:
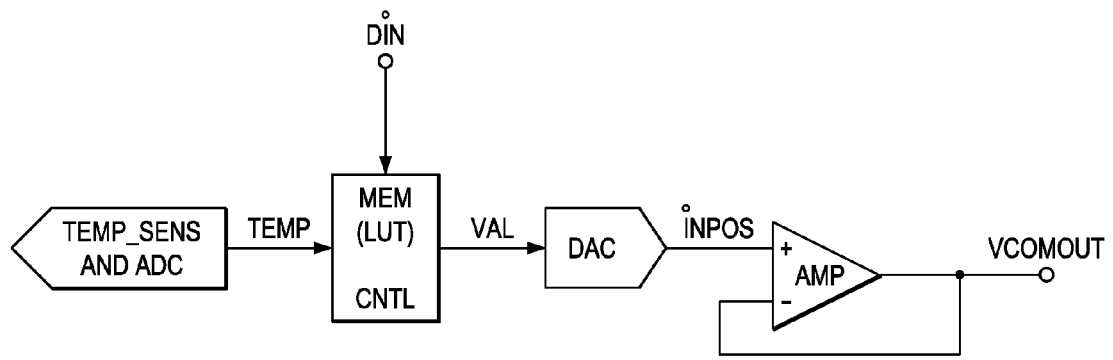
FIG. 3 is a simplified circuit diagram of an adjustable voltage buffer for providing a common reference voltage according to the prior art.

Functional circuitry FC2 (which may be a current mirror or the like) provides that the common reference voltage VCOMOUT remains constant below a specific threshold temperature TTH (as shown in FIG. 2). Controller SCNTL and switch SW prevent any current to flow to node INPOS as long as IFTC1 is lower than IFT. Current IFOS provides the steep slope SS shown in FIG. 2.

Currents INTC, IT and IOS may be easily adjusted to adapt to varying conditions by resistive network NR and resistors R1 to R4. Advantageously, resistors R1 to R4 are externally coupled to pins of the IC 1 according to aspects of the invention.

Figure 5:
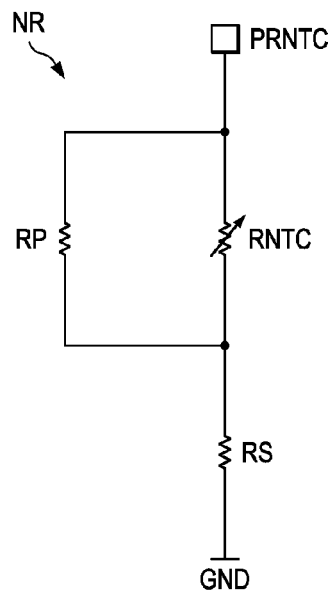
FIG. 5 is a simplified circuit diagram of a resistive network according to an embodiment of the invention.

FIG. 5 shows a simplified diagram of a resistive network NR according an embodiment of the invention. Dependent on the level of integration on the integrated circuit according to the invention, it is possible to couple only the thermistor RNTC to a single pin PRNTC of the IC 1. Beside, the simplest configuration, where the resistive network NR includes only the thermistor, a first resistor RP may be coupled in parallel to the thermistor RNTC. Furthermore, a second resistor RS may be coupled in series to the resistor RP and thermistor RNTC. The configuration shown in FIG. 5 is specifically advantageous for implementing the part of the curve above the steep step SS shown in FIG. 2.

Figure 6:
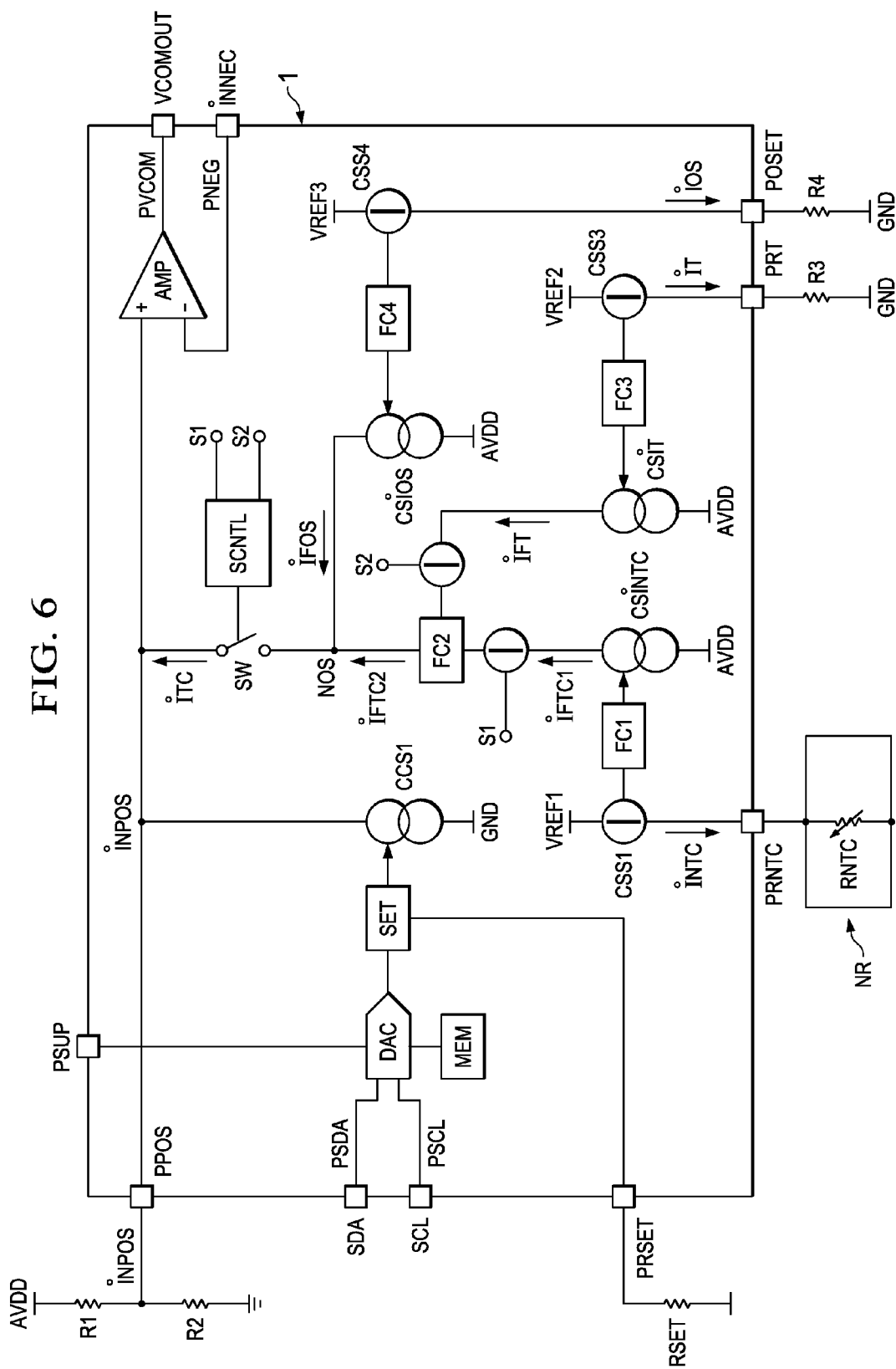
FIG. 6 is a simplified circuit diagram of an embodiment of the invention.

FIG. 6 shows a simplified circuit diagram of an IC 1 according to a third embodiment of the invention. In addition to the components and stages already shown in FIG. 4, which have the same functionality as explained with respect to FIG. 4, there is a memory MEM, a digital-to-analog converter DAC and a current setting stage SET, which operate as explained with respect to FIG. 2. However, the memory MEM and the signals received through pins PSDA and PSCL do not need to implement the curve shown in FIG. 2 in order to adjust the common reference voltage VCOMOUT in response to the display temperature. The temperature dependency of the common reference voltage VCOM may be implemented through the resistive network NR including at least a thermistor RNTC, as well as the combination of control current sources CSINTC, CSIT and CSIOS as well as functional circuitry FC1, FC2, FC3 and FC4, and controller SCNTL. Therefore, memory MEM can be substantially smaller than in prior art integrated circuits.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
   an input pin;
   a temperature measurement pin;
   an amplifier that is coupled to the input pin and that generates a generates a reference voltage;
   a switch that is coupled to the amplifier;
   a current sensor that is coupled to the temperature measurement pin;
   a first functional circuit that is coupled to the current sensor and that generates a first current;
   a second functional circuit that receives the first current and a second current and that provides a difference between the first current and the second current to the switch; and
   a controller that receives the first current and the second current, wherein the controller actuated the switch when the first current is greater than the second current.

2. The apparatus of claim 1, wherein the apparatus further comprises a current source that is coupled to the first functional circuit so as to generate the first current.

3. The apparatus of claim 1, wherein the apparatus further comprises:
   a sensing pin;
   a second current sensor that is coupled to the sensing pin;
   a third functional circuit that is coupled to the second current sensor;
   a current source that is coupled to the third functional circuit so as to generate the second current.

4. The apparatus of claim 1, wherein the apparatus further comprises:
   a sensing pin;
   a second current sensor that is coupled to the sensing pin;
   a third functional circuit that is coupled to the second current sensor; and
   a current source that is coupled to the third functional circuit and the switch.

5. The apparatus of claim 1, wherein the apparatus further comprises:
   a plurality of control pins;
   a digital-to-analog converter (DAC) that is coupled to each of the control pins;
   memory that is coupled to the DAC;
   a current setting stage that is coupled to the DAC; and
   a current source that is coupled amplifier and the current setting stage.

6. An apparatus comprising:
   an input circuit;
   an input pin that is coupled to the input circuit;
   a temperature measurement circuit
   a temperature measurement pin that is coupled to the temperature measurement circuit;
   an amplifier that is coupled to the input pin and that generates a generates a reference voltage;
   a switch that is coupled to the amplifier;
   a current sensor that is coupled to the temperature measurement pin;
   a first functional circuit that is coupled to the current sensor and that generates a first current;
   a second functional circuit that receives the first current and a second current and that provides a difference between the first current and the second current to the switch; and
   a controller that receives the first current and the second current, wherein the controller actuated the switch when the first current is greater than the second current.

7. The apparatus of claim 6, wherein the apparatus further comprises a current source that is coupled to the first functional circuit so as to generate the first current.

8. The apparatus of claim 6, wherein the apparatus further comprises:
   a sensing pin;
   a second current sensor that is coupled to the sensing pin;
   a third functional circuit that is coupled to the second current sensor;
   a current source that is coupled to the third functional circuit so as to generate the second current.

9. The apparatus of claim 8, wherein a resistor is coupled to the sensing pin.

10. The apparatus of claim 6, wherein the apparatus further comprises:
    a sensing pin;
    a second current sensor that is coupled to the sensing pin;
    a third functional circuit that is coupled to the second current sensor; and
    a current source that is coupled to the third functional circuit and the switch.

11. The apparatus of claim 10, wherein a resistor is coupled to the sensing pin.

12. The apparatus of claim 6, wherein the apparatus further comprises:
    a plurality of control pins;
    a reset pin;
    a DAC that is coupled to each of the control pins;
    memory that is coupled to the DAC;
    a current setting stage that is coupled to the DAC and the reset pin; and
    a current source that is coupled amplifier and the current setting stage.

13. The apparatus of claim 12, wherein a resistor is coupled to the reset pin.

14. The apparatus of claim 6, wherein the temperature measurement circuit further comprises a thermistor.

15. The apparatus of claim 6, wherein the input circuit further comprises a voltage divider.

16. An apparatus comprising:
    an input circuit;
    a temperature measurement circuit;
    a first resistor;
    a second resistor;
    an integrated circuit having:
       an input pin that is coupled to the input circuit;
       a temperature measurement pin that is coupled to the temperature measurement circuit;
       a first sensing pin that is coupled to the first resistor;
       a second sensing pin that is coupled to the second resistor;

an amplifier that is coupled to the input pin and that generates a generates a reference voltage;
a switch that is coupled to the amplifier;
a current sensor that is coupled to the temperature measurement pin;
a first functional circuit that is coupled to the current sensor;
a first current source that is coupled to the first functional circuit so as to generate a first current;
a second current sensor that is coupled to the first sensing pin;
a second functional circuit that is coupled to the second sensing circuit;
a second current source that is coupled to the second functional circuit so as to generate a second current;
a third functional circuit that receives the first current and the second current and that provides a difference between the first current and the second current to the switch;
a third current sensor that is coupled to the second sensing pin;
a fourth functional circuit that is coupled to the third current sensor;
a third current source that is coupled to the fourth functional circuit and the switch, wherein the third current source generates a third current; and
a controller that receives the first current and the second current, wherein the controller actuated the switch when the first current is greater than the second current.

17. The apparatus of claim 16, wherein the apparatus further comprises:
a plurality of control pins;
a reset pin;
a DAC that is coupled to each of the control pins;
memory that is coupled to the DAC;
a current setting stage that is coupled to the DAC and the reset pin; and
a current source that is coupled amplifier and the current setting stage.

18. The apparatus of claim 16, wherein a resistor is coupled to the reset pin.

19. The apparatus of claim 16, wherein the temperature measurement circuit further comprises a thermistor.

20. The apparatus of claim 16, wherein the input circuit further comprises a voltage divider.

* * * * *